United States Patent

Borger et al.

Patent Number: 5,723,209
Date of Patent: Mar. 3, 1998

[54] ROLLABLE THERMAL INSULATION BASED ON SYNTHETIC FIBER

[75] Inventors: Heinz-Werner Borger, Bobingen; Peter Knobloch, Grossaitingen, both of Germany

[73] Assignee: Hoechst Trevira GmbH & Co KG, Germany

[21] Appl. No.: 626,825

[22] Filed: Apr. 3, 1996

[30] Foreign Application Priority Data

Apr. 5, 1995 [DE] Germany ............ 195 127 67.6

[51] Int. Cl.$^6$ .................. B32B 5/06; B32B 7/10; D04H 1/54; D04H 3/16
[52] U.S. Cl. .................. 428/219; 156/71; 156/308.2; 428/220; 428/906; 442/275; 442/319; 442/364; 442/382; 442/395; 442/409; 442/414; 442/415
[58] Field of Search ............ 428/906, 219, 428/220; 442/275, 319, 364, 382, 395, 409, 415, 414; 156/308.2, 71

[56] References Cited

U.S. PATENT DOCUMENTS

| | | | |
|---|---|---|---|
| 4,695,338 | 9/1987 | Cousin et al. | |
| 4,818,599 | 4/1989 | Marcus | 442/364 |
| 4,957,804 | 9/1990 | Hendrix | 442/364 |
| 5,043,207 | 8/1991 | Donovan et al. | |
| 5,141,805 | 8/1992 | Nohara et al. | 442/364 |
| 5,173,355 | 12/1992 | Vock et al. | |
| 5,219,635 | 6/1993 | Weiter et al. | |
| 5,298,321 | 3/1994 | Isoda et al. | 442/364 |
| 5,437,909 | 8/1995 | Herzberg | 442/364 |
| 5,508,093 | 4/1996 | Mehdorn | 442/364 |

FOREIGN PATENT DOCUMENTS

| | | |
|---|---|---|
| 0 364 194 | 4/1990 | European Pat. Off. |
| 0 469 309 | 2/1992 | European Pat. Off. |
| 0 585 626 | 3/1994 | European Pat. Off. |
| 1 938 930 | 2/1971 | Germany . |
| 2 157 904 | 6/1973 | Germany . |
| 88/07017.4 | 9/1988 | Germany . |
| 40 12 718 | 10/1991 | Germany . |

*Primary Examiner*—James C. Cannon
*Attorney, Agent, or Firm*—Connolly & Hutz

[57] ABSTRACT

Described is a rollable thermal insulation comprising synthetic fiber material and having a thermal conductivity of not more than 0.04 W/m*K (determined in accordance with DIN 4108 Part 1) and a DIN 4102 Part 1 fire behavior corresponding to building material class B1, wherein the synthetic fiber material is composed of carrier and bonding fibers made of polyester, preferably polyethylene terephthalate, the bonding fibers consisting in at least parts of the surface of a polyester having a melting point which is below the melting point of the carrier fibers.

18 Claims, No Drawings

ROLLABLE THERMAL INSULATION BASED ON SYNTHETIC FIBER

BACKGROUND OF THE INVENTION

This invention relates to a thermal insulation material comprising synthetic fiber. This thermal insulation is rollable, meets the fire behavior requirements of building material class B1 of DIN 4102 Part 1, has a DIN 4108 Part 1 thermal conductivity of less than 0.04 W/m*K, and is recyclable as a single-material system.

Rollable thermal insulation materials based on mineral fibers, for example rockwool, and binders/bonders based on phenolic resins are known. Also known are a number of thermal insulation materials based on fibers of natural origin, for example cellulosic fibers or wool. They frequently require added materials to protect the products sufficiently from impairment due to insect damage and rotting. In addition, added materials are frequently necessary to improve the fire behavior.

German Offenlegungsschrift 1,938,930 describes a process for producing insulating mats from synthetic fiber wastes. It includes the steps of web formation and thermal consolidation with the aid of a thermoplastic binder. The use of fiber waste in the form of polyester, polyamide and a mixture thereof is singled out as particularly advantageous. Polyamide in fiber form and pulverulent thermoplastic binders, such as polyethylene, and also phenolic resins are recommended as bonding agents. Said Offenlegungsschrift contains no mention of recyclable single-material systems. Nor does it contain any reference to a DIN 4108 Part 1 thermal conductivity of less than 0.04 W/m*K coupled with a fire behavior corresponding to building material class B1 DIN 4102 Part 1.

German Utility Model G 88 07 017.4 describes a cushion filled exclusively with a lofty nonwoven comprising bonding fibers, especially core-sheath fibers. Furthermore, this bonding fiber nonwoven is said to be press-formed with a relief in at least some regions. This reference is thus concerned with the combination of a standard fiber, for example based on polyester, and of a bonding fiber, for example polyester in the core, copolyester in the sheath. The object is to make available a cushion structured by the nonhomogeneous pressforming. There are no mentions of a DIN 4108 Part 1 thermal conductivity of less than 0.04 W/m*K coupled with a fire behavior corresponding to building material class B1 (DIN 4102 Part 1), nor of recyclable single-material systems.

European Patent Application 0 469 309 describes a fibrous structure based on polyester, polyamide or polyolefin fibers which consists essentially of a polyester or polyolefin fiber and includes a further component. This further component can be either a multicomponent fiber with an identical composition to the first fiber or else, alternatively, a thermoplastic polymer powder. A process is described for using these fibrous structures to produce mats. These mats are then starting materials for molded parts for use in motor vehicle construction. The multicomponent fiber or the polymer powder are responsible for bonding the fibers of the first component together and so bring about the desired stiffness. The document contains no mention of a rollable thermal insulation material possessing a thermal conductivity of less than 0.04 W/m*K, determined in accordance with DIN 4108 Part 1, coupled with a fire behavior corresponding to building material class B1 (DIN 4102 Part 1).

It is an object of the present invention to make available a thermal insulation which is rollable, which possesses a thermal conductivity of less than 0.04 W/m*K determined in accordance with DIN 4108 Part 1 coupled with a fire behavior corresponding to building material class B1 (DIN 4102 Part 1), and which in addition comprises a single-material system of synthetic fiber material, making it recyclable.

DETAILED DESCRIPTION OF THE INVENTION

The present invention accordingly provides a rollable thermal insulation comprising synthetic fiber material and having a thermal conductivity of not more than 0.04 W/m*K (determined in accordance with DIN 4108 Part 1) and a DIN 4102 Part I fire behavior corresponding to building material class B1, wherein the synthetic fiber material is composed of carrier and bonding fibers made of polyester, preferably polyethylene terephthalate, the bonding fibers consisting in at least parts of the surface of a polyester having a melting point which is below the melting point of the carrier fibers.

The carrier fiber can be made of any melt-spinnable polyesters. Such polyesters consist predominantly of units derived from aromatic dicarboxylic acids and from aliphatic diols. Commonly used aromatic dicarboxylic acid units are the bivalent radicals of benzenedicarboxylic acids, especially of terephthalic acid and of isophthalic acid; commonly used diols have 2 to 4 carbon atoms, and ethylene glycol is particularly suitable. Of particular advantage are melt-spinnable polyester materials containing not less than 85 mol % of polyethylene terephthalate. The remaining 15 mol % are then made up of dicarboxylic acid units and glycol units, which act as modifiers and make it possible for one skilled in the art to influence the physical and chemical properties of the filament products in a specific manner. Examples of such dicarboxylic acid units are radicals of isophthalic acid and of aliphatic dicarboxylic acid, for example glutaric acid, adipic acid, sebacic acid; examples of modifying diol radicals are those of long-chain diols, for example of propanediol or butanediol, of di- or triethylene glycol or, if present in a minor amount, of polyglycol having a molecular weight of about 500 to 2000. Particular preference is given to polyesters containing not less than 95 mol % of polyethylene terephthalate, in particular those composed of unmodified PET. The carrier fibers can take the form of staple fiber, in which case the staple length can vary over a wide range. In the present case, it is also possible to use recycled fibers, for example staple fibers produced from fiber waste and/or suitable fabric waste by means of a combined cutting and pulling process. A further way of making such fibers available comprises melting single-material wastes from the making and processing of synthetic fibers in a conventional manner, optionally filtering and devolatilizing the melt, and regranulating the product. The fibers spun from such (re)granulate may possibly be no longer comparable in quality to the original starting material, but they meet the requirements of the present invention. The formation of the granulate can be circumvented in a conventional manner by spinning directly from the melt.

The polyesters used have a molecular weight corresponding to an intrinsic viscosity (IV) of 0.4 to 1.4 (measured in dichloroacetic acid at 25° C.).

The bonding fiber can be any melt-spinnable polymer material whose melting or softening temperature is below the melting or softening temperature of the carrier fiber, as long as the fibers belong to the same class of materials. Preferably, the bonding fiber comprises a melt-spinnable polyester whose melting or softening temperature has been reduced, with the aid of modifications or additives, compared with the melting or softening temperature of the carrier fiber, which likewise comprises melt-spinnable polyester. The bonding fiber may also take the form of core-sheath fiber; that is, in the case of polyester or more specifically, polyethylene terephthalate, the outer region can have a reduced melting point, for example as the result of modification with isophthalic acid. Beyond that, all constructions are possible—as is customary with bicomponent fibers. In addition, the bonder fibers too may contain a flame retardant to improve the fire protection behavior. Particularly preferably, the bonding and carrier fibers belong to the same class of materials. The bonding fiber takes the form of a staple fiber, and the staple length can vary over a wide range. In the present case, it is also possible to use recycled fibers, i.e. staple fibers produced from fiber waste by means of a combined cutting and pulling process. A further way of making such fibers available comprises melting single-material wastes from the making and processing of synthetic fibers in a conventional manner, optionally filtering and devolatilizing the melt, and regranulating the product. The fibers spun from such (re)granulate may possibly be no longer comparable in quality to the original starting material, but they meet the requirements of the present invention. The formation of the granulate can be circumvented in a conventional manner by spinning directly from the melt.

The proportion of bonding fiber—based on carrier fiber—is up to 50% by weight, preferably 30 to 50% by weight. If the bonding fiber takes the form of a bicomponent fiber, for example the form of a core-sheath fiber, the proportion is 15 to 60% by weight, preferably 30 to 60% by weight.

The thermal insulation of this invention preferably takes the form of a web composed of the above-described carrier and bonding fibers. Consolidation of the web material is effected thermally using hot air. The temperature of the hot air blown through the web is above the melting point, at least above the softening range, of the low melting component (bonding fiber). In addition, it is possible to use other web-consolidating measures, for example microwave irradiation.

The thickness of the thermal insulation of this invention is between 30 and 200 mm, preferably between 80 and 160 mm. The basis weight is between 400 and 3000 g/m$^2$, preferably 1000 to 3000 g/m$^2$. The density is between 15 and 50 kg/m$^3$, preferably between 20 and 30 kg/m$^3$.

The thermal insulation of this invention comprises carrier and bonding fibers belonging to one and the same class of materials. This represents a significant contribution to easy recycling. The synthetic carrier and bonding fibers require no additives for mildew and insect damage resistance.

In a further embodiment of this invention, surface densification of the thermal insulation is possible on one side or else on both sides, for example by lamination. This lamination is a weave, a loop-formed knit, a lay, a loop-drawn knit, a web, a spunbond or a film/sheet made of the same class of material as the load-bearing and bonding fibers to ensure material uniformity and hence recyclability. The attaching of the lamination is effected by means of existing or additional bonding fiber of the same class of materials, additional bonding fibers having a reduced melting point. If necessary, the lamination can also be attached by a needling process exclusively or else additionally to augment the above-described bonding fiber attachment. Preferably the lamination is attached in the same process step in which the consolidating of the rollable thermal insulation takes place.

The making of the thermal insulation comprises the measures of:

a) laydown of the synthetic carrier and bonding fibers on a conveyor belt to form a web, b) thermal treatment of the web of a) in such a way that the binder brings about a consolidation of the web and at the same time the thickness of the web is reduced, c) cooling the web of b).

The carrier and bonding fibers used in process step a) are laid down on the transport belt by means of suitable web-forming measures, in which connection the use of the bonding agent in the form of a fiber, as opposed to a powder, has the effect of preventing process-based deposit formation or any separation of the two components. The quantity of the bonding agent, here a bonding fiber, can be minimized as a result. In general, the bonding agent will be the costlier of the two components. This has a beneficial effect on the costs of the rollable thermal insulation. Since the end product here shall be a rollable thermal insulation, the requirements in respect of the textile data of the fiber types to be used are accordingly low. This also has a beneficial effect on costs. Only economical web formation has to be possible. It is evident therefore to use, as loadbearing fiber, recycled fibers as produced for example by Polywert from conventional fiber waste via a combined cutting and pulling process. The broad staple length distribution with a small proportion of extremely short fibers and an overlength proportion does not cause any problems here. The requirements in respect of the bonding fiber, i.e. a bicomponent fiber, for example, can be particularly low. Here it is similarly possible to use a recycled fiber based on waste, as described above.

The thermal treatment of process step b) is carried out by means of hot air, the temperature of which is chosen so as to make possible a softening or incipient or complete melting of the bonding fiber. The precise temperature thus depends on the bonding fiber used. The hot air treatment is accompanied by a densification of the web, which is in fact desired. The degree of densification is dependent on the chosen hot air velocity, on the intrinsic weight of the web, and on the distance from the hot air nozzle to the surface of the web. The laminating step may be carried out at the same time as the thermal consolidation.

The herein-described thermal insulant based on synthetic fiber material is recyclable, since, according to this invention, the two components belong to one and the same class of materials. In addition, it is possible to feed waste from the making of such a web material, waste from the processing and also the product after use into conventional recycling processes. Alternatively, the above product can be melted and suitably regranulated. This (re)granulate is again spun into fiber, or the above product is remelted without passing through the granulate stage. As a result of the fact that here two components of the same class of material with different melting points are involved, a melting point reduction is likely, so that the fiber thus obtained can be used as bonding or adhesive fiber in the same process. In this way it is possible to fully combine the favorable properties of a rollable thermal insulation based on synthetic fiber comprising a single material with particularly inexpensive manufacture and recyclability.

The thermal insulation produced by means of the above-described process has a fire behavior corresponding to building material class B1 (as defined in DIN 4102 Part 1). It also has a thermal conductivity of less than 0.04 W/m*K, determined in accordance with DIN 4108 Part 1.

The example which follows is for illustration:

The starting materials are Polywert fiber type B and Polywert fiber type C from Polywert. These two fibers are defined as follows. Both are polyester fibers. Polywert fiber type B is 100% fiber based on polyethylene terephthalate. Wastes of various fiber types were mutually approximated with respect to opening and staple length via a pulling process to obtain Polywert fiber type B. The sheath of Polywert fiber type C is formed by a polyester having a reduced melting point. The softening range of the sheath is within the range from 115° C. to 125° C. Here too wastes were homogenized in respect of staple length and separation via two tearing cylinders to obtain Polywert fiber type C.

The two fiber varieties were fed to a roller card in a ratio of 70:30 Polywert fiber type B:Polywert fiber type C and laid down as web. The basis weight is 1,600 g/m², and the crude thickness is about 80 mm. The web passes through a hot air passage. It is transported on a conveyor belt. Hot air is supplied from above. The temperature of the air is 150° C., and the thickness of the insulating material is 60 mm after cooling. Thickness reduction and densification take place as a result of the air velocity, the intrinsic weight and the distance between the hot air nozzles above and the conveyor belt underneath.

The cooled product is of particularly high homogeneity. It is rollable. It has an integrity which permits comparable processing to conventional rollable, fibrous thermal insulation materials. The DIN 4108 Part 1 thermal conductivity is within the range 0.035–0.04 W/m*K. The product consequently conforms to heat conductivity group WLG 040. The fire behavior corresponds to that of building material class B1 (defined in DIN 4102 Part 1). The density is 27 kg/m³.

Similar results are obtained on replacing Polywert fiber type B by a stuffing fiber type. These are fibers based on polyethylene terephthalate which exhibit high bulk as a consequence of pronounced crimp.

Similar results are obtained on replacing the bicomponent fiber with a polyester fiber having a reduced melting point. The same DIN 4108 Part 1 thermal conductivity of less than 0.04 W/m*K (WLG 040) and also the classification as building material class B1 (in accordance with DIN 4102 Part 1) is achieved on varying the thickness within the range from 40 to 200 mm and the density within the range from 20 to 50 kg/m³.

The mixing ratio between Polywert fiber type B and Polywert fiber type C can be varied within a wide range, for example within the range from 15 to 40% of Polywert fiber type C. Since type C is generally the costlier type, it is advisable to minimize this proportion and to prefer the range of 15–30%.

If the bonding fiber used is not a bicomponent fiber, for example a core-sheath fiber, but 100% a fiber having a reduced melting point, the proportion of this fiber can be further reduced down to 10%.

The setting of the mixing ratio between the two fibers and the web forming are effected with the aid of the most economical of the processes available on the market.

What is claimed is:

1. A rollable thermal insulation comprising synthetic fiber material and having thermal conductivity of not more than 0.04 W/m*K (determined in accordance with DIN 4108 Part 1) and a DIN 4102 Part 1 fire behavior corresponding to building material class B1, wherein the synthetic fiber material is composed of carrier fibers and bonding fibers both made of polyester, at least part of the surface of the bonding fibers consisting of a polyester having a melting point which is below the melting point of the carrier fibers.

2. The rollable thermal insulation of claim 1 wherein the bonding fiber is a bicomponent fiber.

3. The rollable thermal insulation of claim 1 wherein the bonding fiber is a fiber having a reduced melting point compared with the carrier fiber.

4. The rollable thermal insulation of claim 1 wherein at least one of the carrier fiber and bonding fiber is a fiber comprising fiber waste.

5. The rollable thermal insulation of claim 1 wherein the carrier fibers and bonding fibers are both made of polyethylene terephthalate.

6. The rollable thermal insulation of claim 1 having a thickness between 30 and 200 mm.

7. The rollable thermal insulation of claim 6 wherein the thickness is between 80 and 160 mm.

8. The rollable thermal insulation of claim 1 having a basis weight between 400 and 3000 g/m².

9. The rollable thermal insulation of claim 8 wherein the basis weight is between 1000 and 3000 g/m².

10. The rollable thermal insulation of claim 1 having a density between 15 and 50 kg/m³.

11. The rollable thermal insulation of claim 10 wherein the density is between 20 and 30 kg/m³.

12. The rollable thermal insulation of claim 1 wherein at least one of the carrier fiber and bonding fiber is produced from a high polymer material with the aid of a melt spinning process, the high polymer starting material having been recovered from fiber-making waste and/or from waste comprising already spun fiber.

13. The rollable thermal insulation of claim 1 including a lamination on at least one side.

14. The rollable thermal insulation of claim 13 wherein the lamination is selected from the group consisting of a weave, a loop-formed knit, a lay, a loop-drawn knit, a web, a spunbond and a sheet made of the same class of material as the carrier fibers and bonding fibers to provide material uniformity and recyclability.

15. The rollable thermal insulation of claim 13 wherein lamination took place on the existing bonding fibers using the action of heat or by means of an adhesive of the same class of material but with a reduced melting point.

16. The rollable thermal insulation of claim 13 wherein the lamination is secured by a needling process.

17. The rollable thermal insulation of claim 13 wherein the lamination is applied on both sides.

18. The rollable thermal insulation of claim 13 wherein the rollable thermal insulation was consolidated and the lamination is attached in the same process step.

\* \* \* \* \*